March 22, 1955 J. W. GRATIAN 2,704,790

REDUCTION OF NOISE LEVEL IN MAGNETIC RECORDING SYSTEMS
BY USE OF A-C BIAS AND/OR D-C CORRECTION OF ASYMMETRY

Filed Aug. 27, 1947

INVENTOR.
JOSEPH W. GRATIAN
BY T. L. Bowes
ATTORNEY 2,704,790

REDUCTION OF NOISE LEVEL IN MAGNETIC RECORDING SYSTEMS BY USE OF A.-C. BIAS AND/OR D.-C. CORRECTION OF ASYMMETRY

Joseph W. Gratian, Rochester, N. Y., assignor to Stromberg-Carlson Company, a corporation of New York Application August 27, 1947, Serial No. 770,784

9 Claims. (Cl. 179—100.2)

Figure 1:
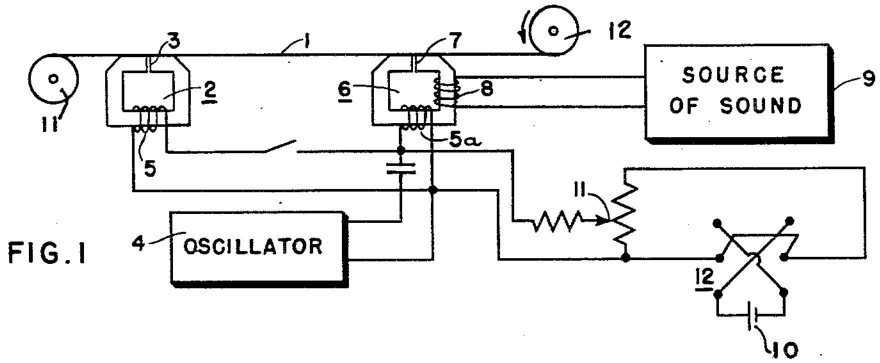

This invention relates to sound recording systems of the magnetic type and more particularly to means for and method of reducing the effective noise level in magnetic recording systems.

It has been discovered that, in general, the noise level of supposedly erased magnetic recording media is appreciably higher than that of a virgin sample. It has also been discovered that the utilization of supersonic bias in the recording head generally results in an additional rise in noise level.

Under ideal conditions, each element of a magnetic media such as wire or tape, for example, leaving either the erasing field or the biasing field should be magnetically neutral in the absence of any audio frequency voltage representing the signal or sound to be recorded. That is, it is desired that the field intensity, as a function of the distance from the point of peak intensity, decay at such a rate that each element of medium is subjected to a sufficiently large number of cycles of gradually reducing field to insure complete demagnetization. If complete demagnetization does not result, some supersonic signal is recorded on the medium and although the supersonic signal is inaudible, the modulation noise caused by this signal results in an audible increase in noise level.

Heretofore, attempts have been made to obtain more complete erasure by varying the shape of the field distribution in such a manner that at a given erase frequency, the field decays more slowly, as by varying the width of the gap and shaping the pole pieces, for example. Such measures are not satisfactory in erase heads because a short gap or gaps are desired so that a given magnetomotive force will be produced with minimum current and heat. With respect to recording heads, such attempts are undesirable because of adverse effects in the high frequency response of the system.

The increase in noise level due to the recording of the supersonic signal may be observed by passing the medium through the erasing field established by a suitable alternating erasing field, disconnecting the erasing signal and then driving the medium at a substantially lower speed through a reproducing head. For example, in one case in which the erasing field was approximately 40 kilocycles per second and the speed of the medium when conducted through the erasing field was two feet per second, an audible signal of approximately 10 kc. tone was observed when the medium was driven through a reproducing head at a speed of approximately 6 inches per second. The signal representing noise can also be observed on an oscilloscope at higher speeds when the playback frequency is such that the gap effect in the playback head does not attenuate the signal too greatly.

Noise resulting from a recorded audio signal may be pictured in the form of higher frequency components and riding the crests of a lower signal frequency. This effect may be readily observed on an oscilloscope showing the output of a low frequency signal up to 700 cycles per second. If, however, a signal of several thousand cycles per second is recorded, the output observed on the oscilloscope appears as a plurality of loops corresponding to the recorded frequency but with respect to which the amplitudes of the peaks vary in a random manner. A similar condition exists when a supersonic signal is recorded and the output contains frequency components well below the frequency of the recorded signal. It is believed that this noise is due primarily to non-uniformity within relatively short intervals of length of the recording medium. The magnitude of these noise components is a function of signal level and, therefore, the noise may justifiably be called modulation noise.

It has also been learned that the effective noise level rises rapidly as distortion in the supersonic signal is increased and it is found necessary either to reduce distortion in the supersonic signal to a minimum or to compensate for the effect of this distortion in order to decrease the effective noise level. One source of such distortion is the high frequency oscillator utilized for the erase field or the recording bias field, or both. It is possible to construct an oscillator having substantially no distortion but on an assembly line in a factory, the amount of distortion varies from oscillator to oscillator because of variations in components, for example, and it is not feasible to select components, such as capacitors and resistors, for example, or otherwise adjust each individual oscillator to a specified minimum distortion.

It is an object of this invention to provide a new and improved magnetic recording system having a minimum noise level.

It is also an object of this invention to provide means for compensating for distortion in a source of relatively high frequency alternating current such as an oscillator, used in magnetic recording apparatus.

It is still another object of my invention to provide a new and improved magnetic sound recording system including means for compensating for noise arising from asymmetry in either erasing field or bias field or both and also for noise arising from incomplete erasure or from modulation noise.

In accordance with the principles of my invention, the amount of recorded supersonic signal is reduced. In order to accomplish this result, the number of effective erase cycles in the erase head and bias frequency in the recording head are properly chosen. It has been found that the bias frequency should be approximately proportional to the speed of the magnetic medium and that the erase and bias frequencies should be greater than the tape speed in inches per second although these values of frequency need not be the same. In order to correct for a symmetry, there is connected a direct current voltage of suitable polarity and quantity in parallel with the supersonic field in either the erasing or recording head or both.

Figure 2:
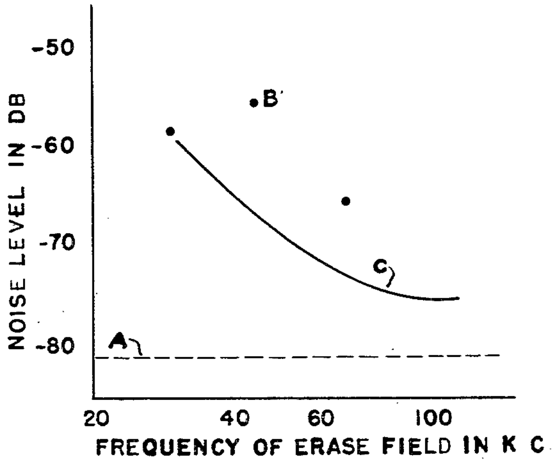
Figure 3:
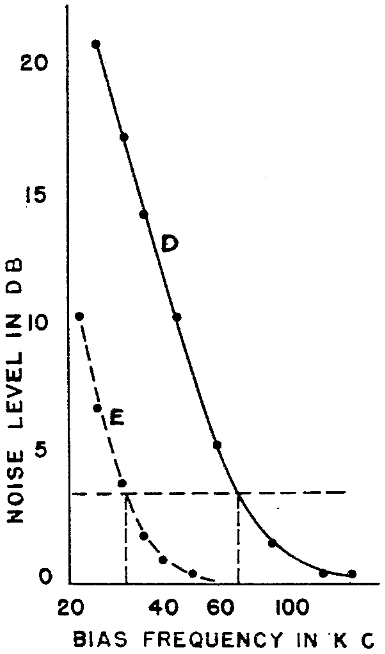

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 represents the electrical circuit of one embodiment of my invention and Figs. 2 and 3 are curves helpful in understanding the principles of my invention.

Referring to Fig. 1, there is illustrated magnetic recording apparatus for recording sound on a paramagnetic medium 1, including an erasing head 2 having a magnetic circuit including gap 3 and means for establishing a relatively high frequency (preferably supersonic) alternating current erasing field in said gap comprising a suitable oscillator 4 and winding 5 on the core of the erasing head 2, the oscillator being subject to distortion or asymmetry of output. There is also provided a suitable recording head 6 having a magnetic circuit including a gap 7 and means for establishing a relatively high frequency (preferably supersonic) alternating current biasing field, including a suitable oscillator which may also be subject to distortion or asymmetry of output and which may be a separate oscillator or may be the same oscillator as used in connection with the erasing head. In the illustrated embodiment of my invention a single oscillator 4 is used for both purposes.

Means is employed for conducting the medium through the erasing field at gap 3 and thereafter through the biasing field at gap 7 at a desired speed by means of the usual reeling mechanism indicated by reels 11 and 12. In order to record sound on the medium at gap 7, means is provided for adding at gap 7 another field representing the audio frequency of the sound to be recorded and may, for example, comprise a winding 8 on the core of recording head 6 and a suitable source of sound 9 which may be a microphone and amplifier, if necessary or the source of audio voltage may be connected in parallel with the source of bias.

In order to change the effect of any distortion or asymmetry of oscillator 4 or to compensate or oppose any such distortion or asymmetry, there is provided in parallel with coils 5 and *5a* a suitable source of direct current, it being understood that the connections may be such that the compensating direct current may be utilized to modify the field at gap 3 or gap 7, or both. In the illustrated form of my invention there is shown a battery 10 reversibly connected across the resistance portion of a potentiometer 11 as by means of a suitable double-pole double-throw switch 12. The variable portion of the resistance of potentiometer 11 is connected in parallel with coil 5 or coil *5a*, or both, as shown in Fig. 1. Thus, any amount within the capacity of the source of direct current of either polarity may be applied. While there is illustrated a source of direct current comprising a battery 10, it is within the principles of my invention to derive the necessary direct current from the rectifier usually employed with such equipment for plate supply of any electron discharge tubes used in connection therewith, and a fixed amount of compensation provided after correct direction and amplitude is determined.

Fig. 2 is a curve showing the relationship between the noise level in db below saturated output and the frequency of the erasing field in kilocycles per second. The horizontal dash line, indicated by A, represents the amplifier noise level. Measurements of the effective noise level may be made at several different frequencies. The results of such measurements at erasing frequencies of 30, 45, 70 and 120 kilocycles for example, may be as shown by means of the dots denoted by the letter B in Fig. 2, and indicate that distortion in the oscillator used as the source of field current is random in effect as the frequency is changed and may not be predicted.

The curve C of Fig. 2 represents the noise level when sufficient D. C. of correct polarity is introduced to achieve minimum noise. It is evident that substantial improvement in noise level results. It is also apparent that as the frequency is increased a distinct improvement in noise level is obtained and that a satisfactory condition of noise level is reached in the vicinity of 100 kilocycles per second. Inasmuch as the curve C is drawn from test data recorded with a magnetic medium speed of 2 ft. per second, it is evident that the frequency of satisfactory operation is of the order of fifty times the speed of the medium in feet per second or four times the speed of the medium in inches per second. At any substantially lower erase frequency in the erase head or bias frequency in the recording head, increased noise is present.

As an example, it is interesting to note that, according to actual test data, when the erasing frequency was 120 kilocycles per second and the erase current was 240 milliamperes, the saturated signal-to-noise ratio was 58 db, but with the addition of 7 milliamperes of D. C., the saturated signal-to-noise ratio was increased to 74 db, an improvement of 16 db.

Fig. 3 represents the effect of bias frequency on noise level above erased noise level at two different speeds when the recording medium is conducted through the erasing and recording fields. Curve D represents typical test data at a speed of two feet per second and curve E is based on similar data at a speed of eight inches per second. In each case the zero ordinate represents the erased noise level which corresponds to the noise level of the medium when completely demagnetized or in the virgin state. In order that the noise introduced by the bias field be a function only of medium speed, D. C. compensation, as previously described, was applied in parallel with the supersonic bias as required to compensate for slight distortion in the bias signal.

A comparison of curves D and E shows that the bias frequency required for a given noise level is approximately proportional to the speed of the medium. Reduction of the noise introduced by the bias field to a reasonably unobjectionable value or to a value approximating the noise of the demagnetized medium requires that the total effective noise be within 3 db of the erased noise level. Hence, according to these curves, to reduce noise to 3 db or less the bias frequency should be of the order of at least three times the speed of the medium in inches per second or greater at a speed of 2 feet per second and at least four times at a speed of 8 inches per second (see Fig. 3). The ratio may be greater or lower depending upon the degree of noise reduction desired. It may be of interest to note that with the system used to obtain the data for curves D and E, frequency response was down approximately 10 db at 10 kc. at eight inches per second speed. Systems with inherently poorer high frequency response will gain less improvement in noise level.

As is well understood in the art, the bias frequency should be sufficiently high to avoid beats. Commonly, the bias frequency is chosen to be several times, preferably three or more times that of the upper limit of the usable frequency range. In this connection, the RMA Standards define the frequency range as extending from that low frequency at which the response is 15 db below the flat response level to that high frequency at which the response is also 15 db below the flat response level, all response data being determined at the recording speed.

While I have shown a particular embodiment of my invention, modifications and other embodiments will occur to those skilled in the art. For example, if heads 2 and 6 are of different impedances, two adjustable sources of direct current may be necessary. Also, different sources of alternating current may be employed for erase and bias fields. Moreover, in many if not most cases, any signal recorded at the erase head because of asymmetry in the erase signal, may be erased in the recording head by the bias field, in which case direct current compensation only in the recording head is required. I, therefore, do not desire my invention to be limited to the particular construction shown and described, and intend in the appended claims to cover all modifications within the spirit and scope of my invention.

What I claim is:

1. Magnetic recording apparatus for recording sound on a paramagnetic medium comprising a magnetic circuit including an air gap, means for establishing a high frequency bias field in said gap, and means for establishing a direct current compensating field in said gap, the last-mentioned means including control means whereby the polarity and amplitude of said direct current field are selectable to compensate substantially for asymmetry of said bias field.

2. Magnetic recording apparatus for recording sound on a paramagnetic medium comprising a magnetic circuit including an air gap, means for providing a relatively high frequency alternating current for establishing a high frequency bias field in said gap, and a source of direct current for establishing a direct current compensating field in said gap, the last-mentioned means including control means whereby the polarity and amplitude of said direct current compensating field are selectable in order to change the effect of distortion in said high frequency bias field.

3. Magnetic recording apparatus for recording sound on a paramagnetic medium comprising a magnetic circuit including an air gap, means for providing a relatively high frequency alternating current for establishing a high frequency bias field in said gap, a source of direct current for establishing a direct current compensating field in said gap, and means cooperating with said source of direct current whereby the polarity and amplitude of said direct current compensating field are selectable in order to compensate substantially for the effect of distortion in said high frequency bias field.

4. Magnetic recording apparatus for recording sound on a paramagnetic medium comprising a magnetic circuit including an air gap, means for conducting said medium across said gap, means for providing a relatively high frequency alternating current for establishing a high frequency bias field in said gap, and means for establishing a direct current compensating field in said gap, said establishing means including control means whereby the polarity and amplitude of said direct current field are selectable to compensate substantially for asymmetry of said bias field, the frequency in kilocycles per second of said alternating current field being greater than the speed of said medium in inches per second, and said frequency also being at least approximately four times the frequency in the vicinity of the upper end of the recorded frequency range at which the response is fifteen db below the flat response level.

5. Magnetic recording apparatus for recording sound on a paramagnetic medium comprising means for erasing previously recorded sound or noise on said medium, means for recording sound on said medium, means for establishing a relatively high frequency erasing field in said erasing means, means for establishing a relatively high frequency bias field in said recording means, and means for also establishing a direct current compensating field in parallel with at least one of the aforementioned fields, said compensating field including control means whereby the polarity and amplitude of said direct current compensating field are selectable to compensate for asymmetry in the parallel alternating current field.

6. In magnetic recording apparatus for recording sound on a paramagnetic medium, an erasing head having means for establishing a high frequency alternating current erasing field, a recording head having means for establishing a high frequency alternating current bias field, means for conducting said medium through said erasing field and then through said bias field, means for subjecting said medium during passage through said recording field to another field representing the sound to be recorded, and means for establishing a direct current compensating field in parallel with the high frequency field of at least one of said heads, said establishing means including control means whereby the polarity and amplitude of said direct current compensating field are selectable to compensate for asymmetry in said parallel high frequency establishing means.

7. In magnetic recording apparatus for recording sound on a paramagnetic medium, an erasing head having means for establishing a high frequency alternating current erasing field, a recording head having means for establishing a high frequency alternating current bias field, means for conducting said medium through said erasing field and then through said bias field, means for subjecting said medium during passage through said recording field to another field representing the sound to be recorded, and means for applying a direct current to at least one of said heads in order to establish a direct current compensating field in parallel with the associated high frequency field, said applying means including control means whereby the polarity and amplitude of said direct current field are selectable in order to compensate for asymmetry in said associated high frequency establishing means, said bias frequency in kilocycles per second being substantially greater than the speed of said medium in inches, and said frequency also being at least approximately four times the frequency in the vicinity of the upper end of the recorded frequency range at which the response is fifteen db below the flat response level.

8. A magnetic recording system comprising: a magnetic recording head, means for supplying signal frequency current to said head; means for supplying high frequency bias current to said head, and means supplying to said head a direct current component; said last means including selectable means for reversing the polarity of the direct current component.

9. Means for easing past history from a magnetic wire or tape including means for passing said wire through a magnetic field, means providing said magnetic field including means for continually energizing the field during the passage of the wire with magnetizing forces, said latter means comprising a constant direct current source and a constant oscillatory source of a frequency in the supersonic range, the magnetizing forces derived from said respective sources being supplied simultaneously.

References Cited in the file of this patent

UNITED STATES PATENTS

| | | |
|---|---|---|
| 1,287,982 | Hartley | Dec. 17, 1918 |
| 1,640,881 | Carlson | Aug. 30, 1927 |
| 1,886,616 | Alverson | Nov. 8, 1932 |
| 2,235,132 | Woolridge | Mar. 18, 1941 |
| 2,265,831 | Woolridge | Dec. 9, 1941 |
| 2,351,004 | Camras | July 13, 1944 |
| 2,355,940 | Zuschlag | Aug. 15, 1944 |
| 2,361,752 | Eilenberger | Oct. 31, 1944 |

FOREIGN PATENTS

| | | |
|---|---|---|
| 119,071 | Japan | Feb. 17, 1937 |
| 218,407 | Switzerland | Mar. 16, 1942 |
| 875,721 | France | Oct. 3, 1941 |

OTHER REFERENCES

FIAT Final Report #705, 44 pages, January 1946.

Supersone Bias for Magnetic Recording Electronics, July 1945, 11 pages.

Journal of the Institute of Electrical Communication Engineers of Japan, No. 180, March 1938, pp. 144–148.